(12) United States Patent
Lerma Arce et al.

(10) Patent No.: US 11,181,694 B2
(45) Date of Patent: Nov. 23, 2021

(54) INTEGRATED OPTICAL SWITCHES USING DEUTERATED LIQUIDS FOR INCREASED BANDWIDTH

(71) Applicant: COMMSCOPE CONNECTIVITY BELGIUM BVBA, Kessel-Lo (BE)

(72) Inventors: Cristina Lerma Arce, Gentbrugge (BE); Jan Watté, Grimbergen (BE); Roland Simon H. Claes, Dendermonde (BE); Yolanda Justo Zarraquinos, Etterbeek Bruxelles (BE); Frank Gommaar R. De Voeght, Dendermonde (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 666 days.

(21) Appl. No.: 16/075,274

(22) PCT Filed: Feb. 3, 2017

(86) PCT No.: PCT/EP2017/052477
§ 371 (c)(1),
(2) Date: Aug. 3, 2018

(87) PCT Pub. No.: WO2017/134287
PCT Pub. Date: Aug. 10, 2017

(65) Prior Publication Data
US 2021/0199892 A1    Jul. 1, 2021

Related U.S. Application Data

(60) Provisional application No. 62/291,300, filed on Feb. 4, 2016.

(51) Int. Cl.
*G02B 6/35* (2006.01)
*G02B 6/12* (2006.01)

(52) U.S. Cl.
CPC ............ *G02B 6/3538* (2013.01); *G02B 6/12* (2013.01); *G02B 6/3596* (2013.01); *G02B 2006/12145* (2013.01); *G02B 2006/12147* (2013.01)

(58) Field of Classification Search
None
See application file for complete search history.

(56) References Cited

U.S. PATENT DOCUMENTS 7,773,840 B2 *   8/2010   Kwakernaak .......... G02B 6/136
                                                                        385/29
2003/0012483 A1   1/2003   Ticknor et al.
(Continued)

FOREIGN PATENT DOCUMENTS

| WO | 2015/092064 A1 | 6/2015 |
| WO | 2016/107769 A1 | 7/2016 |
| WO | 2016/131825 A1 | 8/2016 |

OTHER PUBLICATIONS

International Search Report and Written Opinion of the International Searching Authority for International Patent Application No. PCT/EP2017/052477 dated Mar. 21, 2017, 11 pages.

*Primary Examiner* — Tina M Wong
(74) *Attorney, Agent, or Firm* — Merchant & Gould P.C.

(57) ABSTRACT

An electro-wetting optical device includes an optical switch that uses a coupling region proximate a waveguide in a substrate. The device uses two optical liquids, providing first and second refractive indices respectively. At least one of the optical liquids is deuterated. Under a first switching configuration the first optical liquid is positioned at the coupling region so as to provide a first effective refractive index for light propagating along the first waveguide and under a second switching configuration the second optical liquid is
(Continued)

positioned at the coupling region so as to provide a second effective refractive index for light propagating along the first waveguide.

7 Claims, 7 Drawing Sheets

(56) References Cited

U.S. PATENT DOCUMENTS

| | | | |
|---|---|---|---|
| 2003/0012538 A1 | 1/2003 | Johnson et al. | |
| 2004/0091201 A1 | 5/2004 | Divoux et al. | |
| 2009/0028497 A1* | 1/2009 | Kodama | H05K 1/0274 |
| | | | 385/14 |
| 2021/0199892 A1* | 7/2021 | Lerma Arce | G02B 6/12 |

* cited by examiner

INTEGRATED OPTICAL SWITCHES USING DEUTERATED LIQUIDS FOR INCREASED BANDWIDTH

CROSS-REFERENCE TO RELATED APPLICATION

This application is a National Stage Application of PCT/EP2017052477, filed on Feb. 3, 2017, which claims the benefit of U.S. Patent Application Ser. No. 62/291,300, filed on Feb. 4, 2016, the disclosures of which are incorporated herein by reference in their entireties. To the extent appropriate, a claim of priority is made to each of the above disclosed applications.

FIELD OF THE INVENTION

This invention is related to optical fiber data communication systems and to optical switch devices used in such systems for controlling and managing optical signals.

BACKGROUND OF THE INVENTION

Optical fiber networks are becoming prevalent in part because service providers want to deliver high bandwidth communication capabilities to customers. Such networks are a desirable choice for delivering high-speed communication data because they can avoid the use of active electronic devices, such as amplifiers and repeaters, between a central office and a subscriber termination. The absence of active electronic devices may decrease network complexity and/or cost and may increase network reliability.

Optical fiber networks, however, have been mostly passive, which limits their functionality and manageability. The addition of active optical devices to control and manage optical signals is an important step in realizing an improved, smart optical fiber network. Optical fiber networks operate over a large range of wavelengths, however, and so it is important that active optical devices used in optical fiber networks are also capable of operating over the same wavelength range.

SUMMARY OF THE INVENTION

An embodiment of the invention is directed to an electro-wetting optical device that has a substrate supporting at least a first waveguide, a second waveguide and a coupling region between the first and second waveguides. A first optical liquid has a first refractive index and a second optical liquid has a second refractive index different form the first refractive index. At least one of the first optical liquid and the second optical liquids is deuterated. A first portion of the first optical liquid and a the second portion of the second optical liquid are moveable relative to the coupling region whereby, under a first switching configuration the first optical liquid is positioned at the coupling region so as to provide a first effective refractive index for light propagating along the first waveguide and under a second switching configuration the second optical liquid is positioned at the coupling region so as to provide a second effective refractive index for light propagating along the first waveguide.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
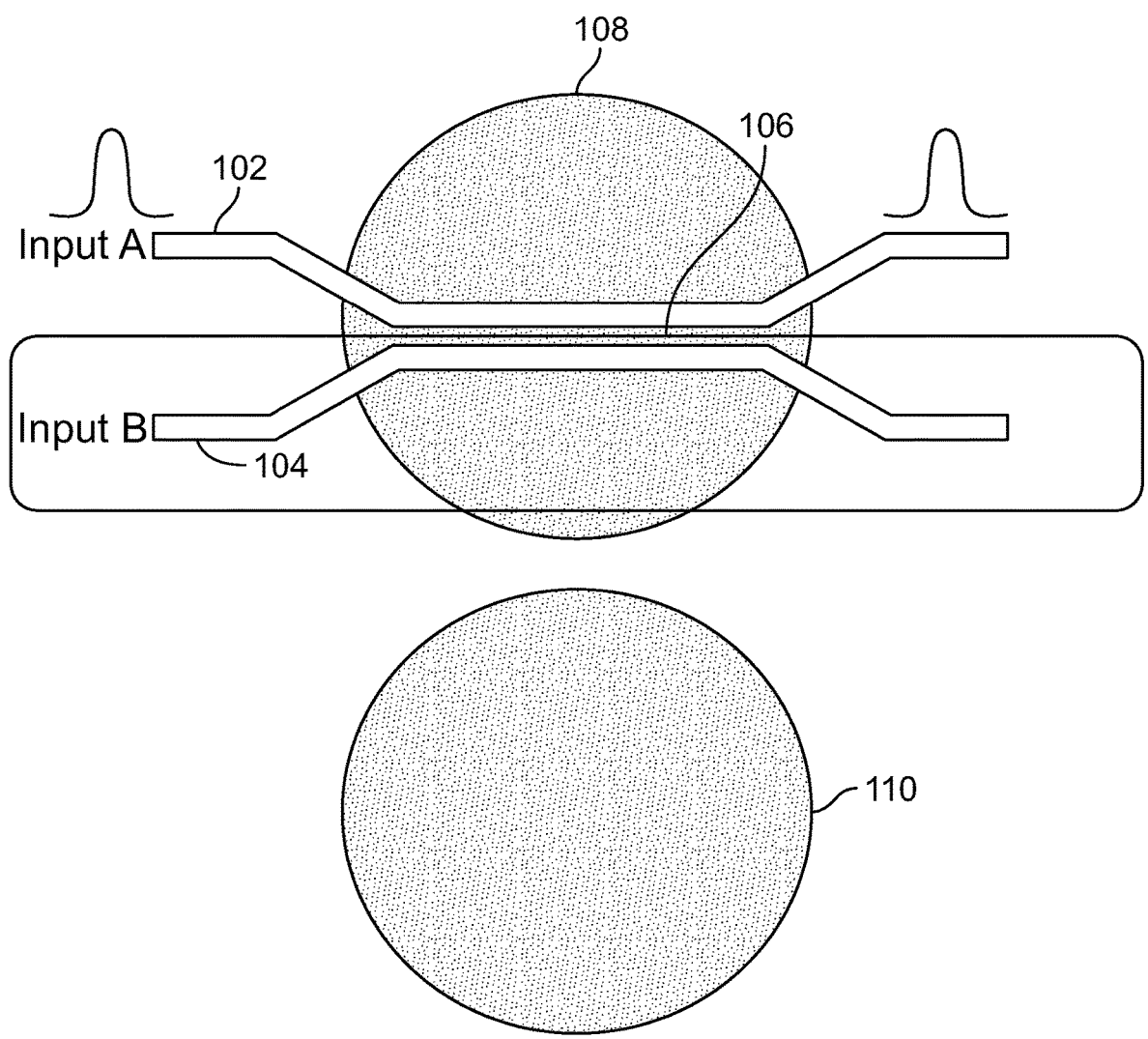
FIG. 1 schematically illustrates an embodiment of a waveguide optical switch according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is directed to various optical devices and systems that can provide benefit in optical networks. In particular, the invention is directed to integrated optical switching devices capable of operating over an extended bandwidth that permits signals of multiple functionalities to be transmitted over, and controlled within, a fiber network.

FIG. 1 schematically illustrates an embodiment of an integrated optical switch 100. The optical switch 100 incorporates a first waveguide 102 and a second waveguide 104. The first and second waveguides 102, 104 are physically close to one another in a coupling region 106, a region in space where light propagating along one of the waveguides 102, 104 may couple to the other waveguide 104, 102. Whether light couples between the waveguides 102, 104 depends on the effective refractive index experienced by the light as it propagates along the waveguides 102, 104. The effective refractive index can be altered by positioning a fluid of greater or lesser refractive index close to the coupling region 106.

The figure shows two droplets of liquid. A first droplet 108 is positioned over the coupling region 106 and a second droplet 110 is positioned to the side of the coupling region 106. The first droplet 108 has a first refractive index and the second droplet 110 has a second refractive index, different from the first refractive index. A microfluidic channel may be used for controlling the positions of the first and second droplets 108, 110 relative to the coupling region 106. In the illustrated embodiment, an optical signal transmitted into the first waveguide 102 is output from the first waveguide 102 when the first droplet 108 is over the coupling region 106. This is referred to as the switch's "bar state." The optical signal is output from the second waveguide 104 when the second droplet 110 is positioned over the coupling region 106. This is referred to as the switch's "cross state." Microfluidic optical switches have previously been described, for example in U.S. Provisional Patent Application No. 62/094,506, "Integrated Optical Switching and Splitting for Optical Networks," filed on Dec. 19, 2014, and in U.S. Provisional Patent Application No. 62/116,784, entitled "Remote Control and Power Supply for Optical Networks," filed on Feb. 16, 2015, both of which are incorporated herein by reference.

Figure 2A:
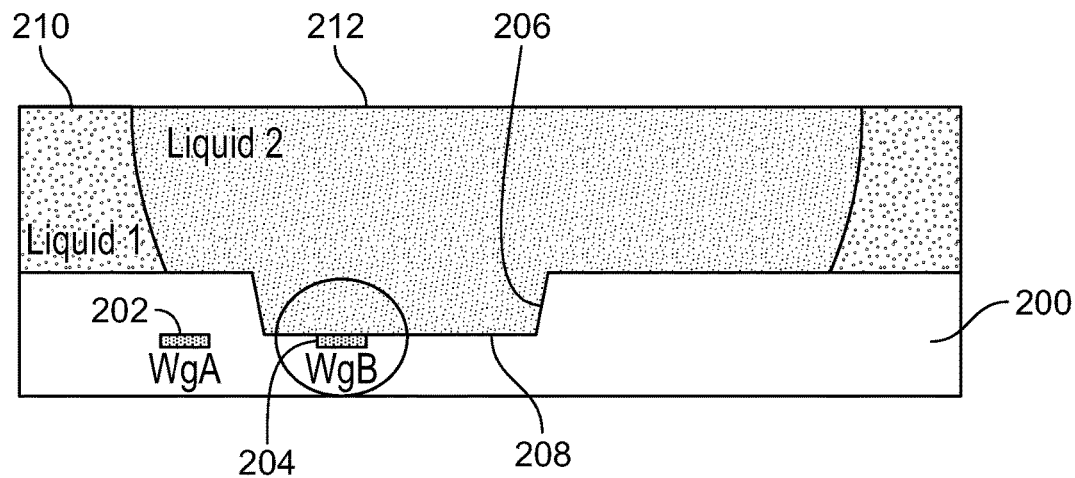
FIG. 2A schematically illustrates a cross-sectional view through waveguide optical switch according to an embodiment of the invention.

A cross-section through a microfluidic optical waveguide switch is schematically illustrated in FIG. 2. In this embodiment, the substrate 200 contains the first waveguide 202 and the second waveguide 204. An etched region 206 above the second waveguide 204 exposes the second waveguide 204 at or close to the upper surface 208 of the substrate 200. The first waveguide 202 remains buried below the upper surface 208 of the substrate 200. In the illustration, the droplet 212 of the second liquid is positioned above the etched region 206, so that the refractive index of the second liquid 212 affects the effective refractive index experienced by light propagating along the second waveguide 204. According to the illustrated embodiment, light can couple between the first and second waveguides 202, 204 when the droplet 212 of the second liquid is in the etched region 206. In other words, the switch is in the cross state.

When the droplet 210 of the first liquid is moved over the etched region, the effective refractive index experienced by the light propagating along the waveguides 202, 204 is changed, preventing coupling of light between the waveguides 202, 204, and the switch is in the bar state.

Figure 2B:
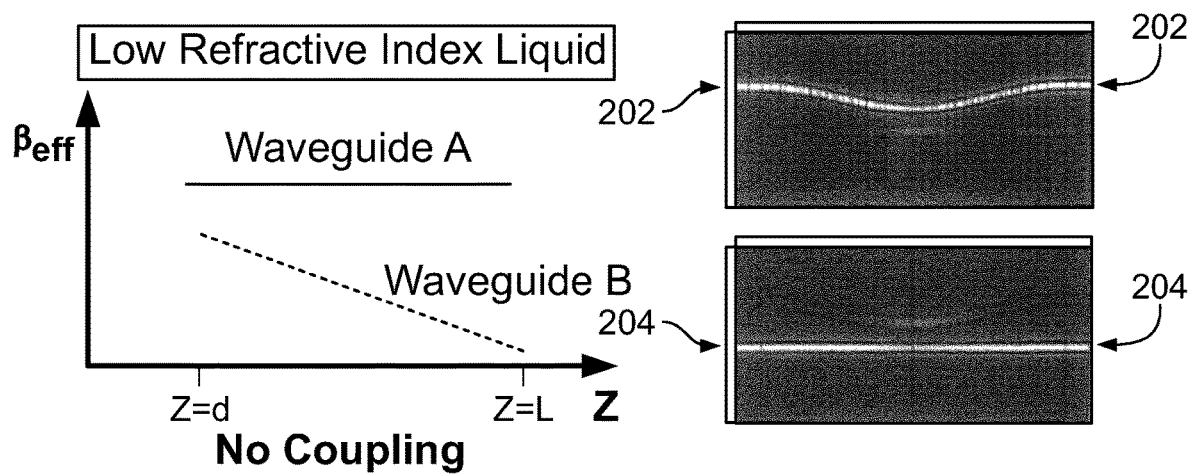
FIG. 2B illustrates operation of a waveguide optical switch in a bar state, according to an embodiment of the invention.
Figure 2C:
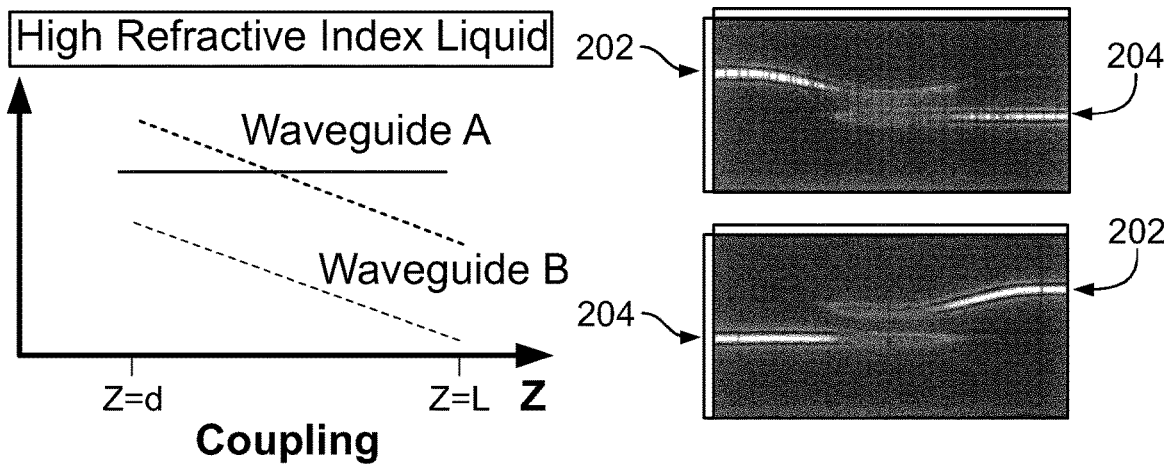
FIG. 2C illustrates operation of a waveguide optical switch in a cross state, according to an embodiment of the invention.

FIG. 2B and FIG. 2C illustrate how light is coupled between waveguides in the type of optical switch described above. FIG. 2B illustrates the switch in the bar state, when a liquid of relatively low refractive index is positioned above the etched region. The graph shows a plot of effective propagation constant, $\beta_{eff}$, as a function of position, z, along the coupling region. The flat line, labeled, waveguide A, illustrates the effective propagation constant for the waveguide along which the light is propagating and the sloped line (waveguide B) illustrates the effective propagation constant for the other waveguide. Since there is a gap between the effective propagation constants, light does not couple from one waveguide to the other. This is seen in the pictures to the right of the graph, where light entering the switch on the first waveguide 202 remains on the first waveguide (upper picture) and light entering the switch on the lower waveguide 204 remains in the lower waveguide (lower picture).

FIG. 2C illustrates the situation with the switch in the cross state. In this case, the graph shows the effective propagation constant of the other waveguide crosses that of the waveguide along which the light is propagating, allowing light to propagate between the two waveguides. This is seen in the pictures to the right of the graph, in which the light entering the switch on the first waveguide 202 exits the switch on the second waveguide 204 (upper picture) and light entering the switch on the second waveguide 204 exits the switch on the first waveguide 202 (lower picture).

Figure 3:
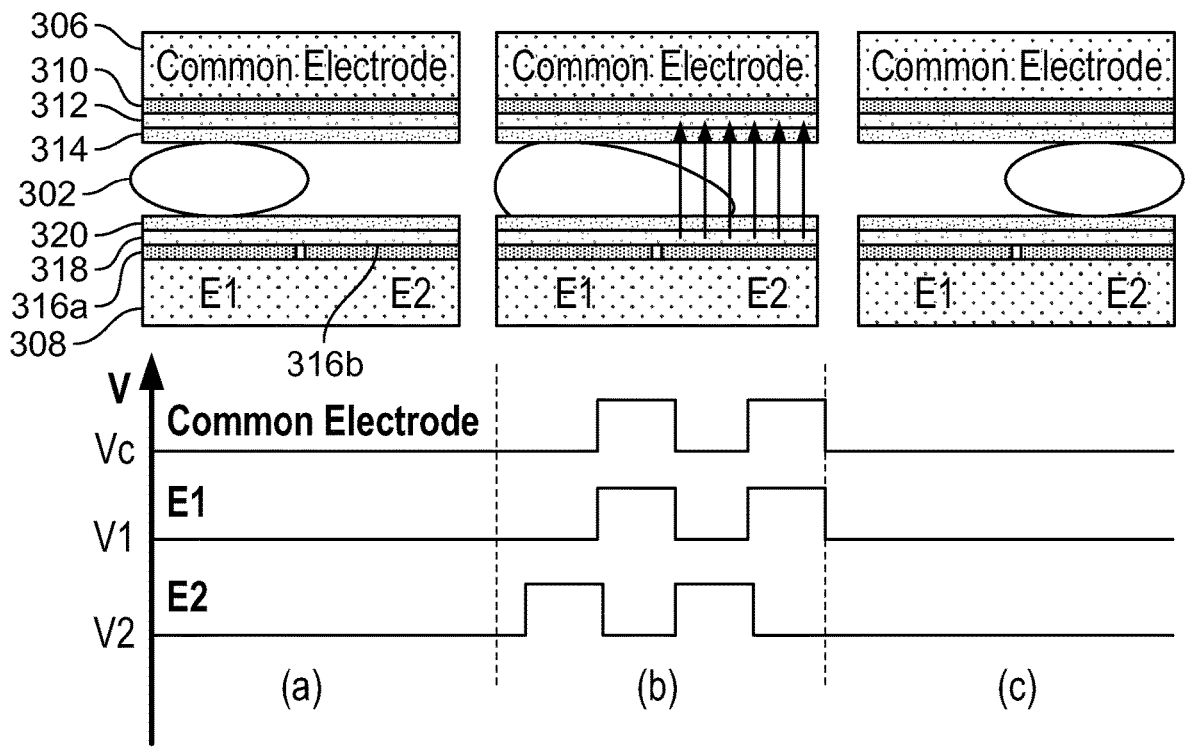
FIG. 3 illustrates principles of electro-wetting in an optical switch.

A microfluidic approach to moving the optical liquids relative to the waveguides, using the technique of electro-wetting, is schematically illustrated in FIG. 3. A liquid droplet 302 is disposed within a microchannel 304 formed between two walls 306, 308. The first wall 306 is provided with a common electrode 310, insulated from the channel 304 by a first dielectric layer 312 which provides electrical insulation between the common electrode 310 and the liquid droplet 302. A first hydrophobic layer 314 may be deposited over the first dielectric layer 312.

The second wall 308 is provided with a number of electrodes 316 that can be activated with an applied voltage independently of each other. In the illustrated embodiment, there are two independently addressable electrodes 316a, 316b, but it will be appreciated that other embodiments of the invention may include a larger number of addressable electrodes 316. A second dielectric layer 318 insulates the electrodes 316a, 316b from the channel 304. A hydrophobic layer 320 may be deposited over the second dielectric layer 318.

The electro-wetting effect can be described as a change in the contact angle of the liquid due to an applied potential difference between the liquid and the channel wall. Thus, when a potential is applied to one of the electrodes 316, the surface tension of the droplet can be reduced, allowing it to "wet" the channel wall 308 in the direction toward the electrode 316 across which the potential is applied.

In FIG. 3a, the liquid droplet 302 is above the first addressable electrode 316a. The graph below the channel cross-section shows the voltages applied to the common electrode, Vc, the voltage applied to the first addressable electrode 316a, Va, and the voltage applied to the second addressable electrode, Vb. In FIG. 3a, there is no voltage applied to any electrode. In FIG. 3b, voltages are applied sequentially to the second addressable electrode 316b and to the common electrode 310 and the first addressable electrode 316a, which results in movement of the droplet 302 to a position over the second addressable electrode 316b, as shown in FIG. 3c. Thus, the selective application of electrical potentials to the electrodes of the electro-wetting device can result in a desired movement of the liquid droplet 302. The use of the electro-wetting effect to move liquid droplets is well known, and the use of microfluidics in the control of optical waveguide devices has been described in WO2015/092064A1, "Adiabatic Coupler," filed on Dec. 21, 2014, incorporated herein by reference, in U.S. Provisional Patent Application No. 62/094,506, "Integrated Optical Switching and Splitting for Optical Networks," filed on Dec. 19, 2014, and in U.S. Provisional Patent Application No. 62/116,784, entitled "Remote Control and Power Supply for Optical Networks," filed on Feb. 16, 2015, both of which have been incorporated by reference. Of course, it will be appreciated that other conformations and configurations of electrode and liquid can be used to move the droplets 302.

Such an approach may also be used to move two or more liquids. For example, if a channel contains two immiscible liquids, separated at an inter-liquid interface, movement of one of the liquids via an electro-wetting technique can result in both liquids being moved along the channel. One advantage of this technique is that the second liquid can be moved along the channel by the electro-wetting forces acting on the first liquid, even though the second liquid itself does not exhibit electro-wetting behavior, or only responds weakly to an electro-wetting control signal.

Various materials may be used for the substrate and the waveguides, depending on the desired wavelength of light that is used in the particular application. Many applications in optical communications use light in the region of around 1260 nm-1650 nm, for example to transmit internet data, cable video signals and various monitoring signals. One suitable substrate for this range of wavelengths is silicon dioxide, although others may be used. A typical waveguide cross-section for operation at the 1260 nm-1650 nm wavelength range is about 220 nm by 460 nm, although the dimensions of the waveguide may be different from this and may be dependent on such factors as the desired degree of containment in the waveguide and the relative difference between the refractive indices of the waveguide and substrate.

Various materials may also be used for the high and low index optical liquids used in the electro-wetting optical devices (EWODs). Generally, for effective switching, the difference in refractive index between the high and low index optical liquids is around 0.15 or more. Some liquids that may be used as the low index optical liquid include propylene glycol (refractive index around 1.43) and ethylene glycol (refractive index around 1.43) and hydroxypropylene carbonate (HPC) (refractive index around 1.44). Liquids that may be used as the high index optical liquid include diphenylsulfide (DPS) (refractive index around 1.6). It is preferred that the temperature dependences of the refractive indices of the low and high index optical liquids are similar over an operating range of about −40° C. to 70° C., so that the difference in refractive index between the two liquids remains relatively unchanged over the temperature range.

Figure 4A:
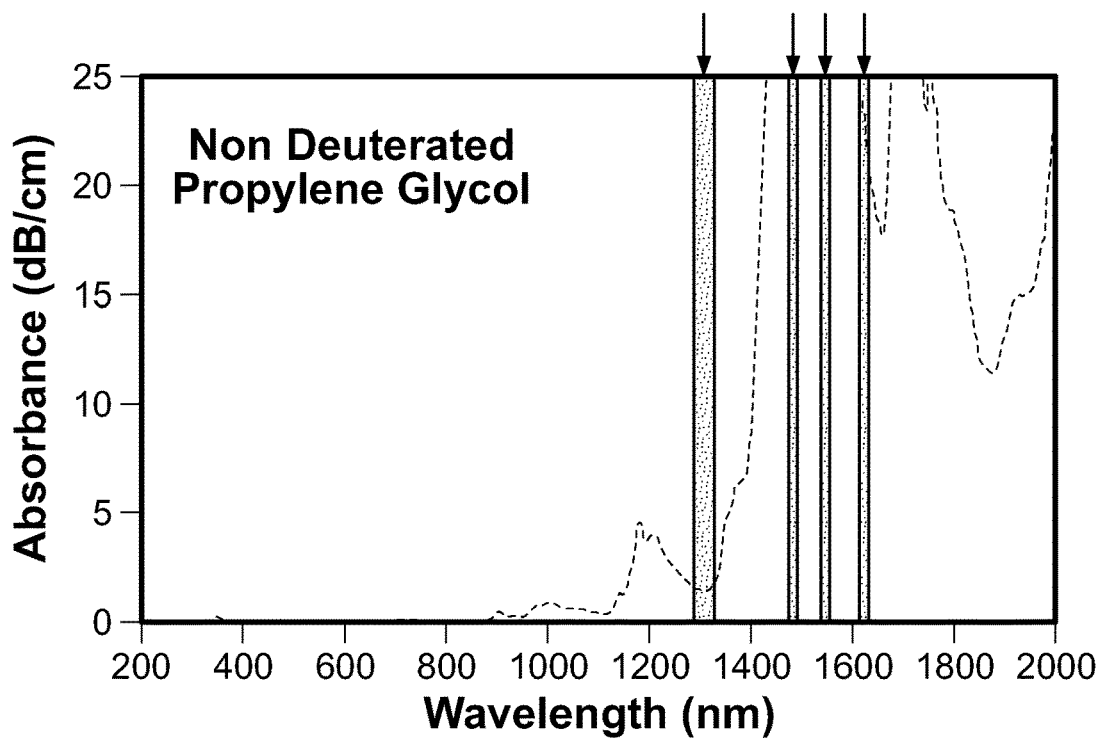
FIGS. 4A and 4B present absorption spectra over the visible and near infrared portions of the electromagnetic spectrum for non-deuterated propylene glycol and deuterated propylene glycol, respectively.
Figure 4B:
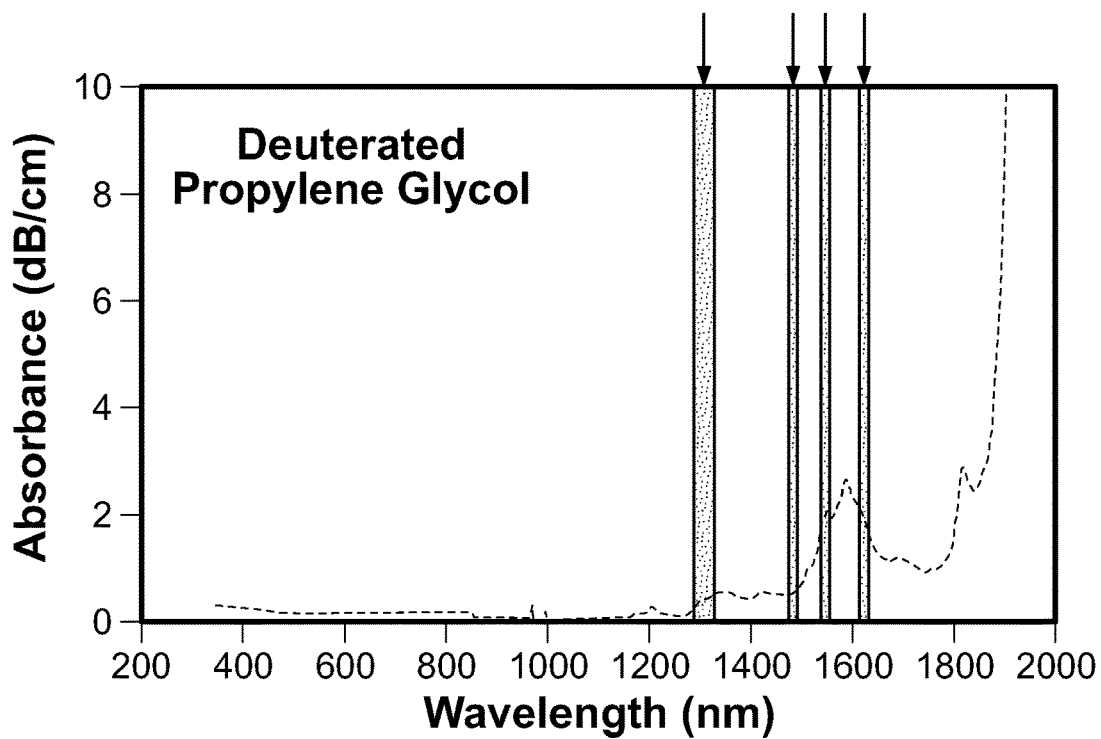

Furthermore, it is preferred that the optical liquids demonstrate low optical absorption of the light passing through the EWOD devices. As indicated above, a typical wavelength operating range for a fiber communication system is around 1260 nm to around 1650 nm. Unfortunately, it has been found that several liquids that might otherwise be suitable for use in an EWOD device have absorption bands that impinge on this preferred operating range. For example, the near infrared absorption spectrum of propylene glycol, shown in FIG. 4A, demonstrates significant absorbance at wavelengths above 1400 nm, making this material unsuitable for broad wavelength operation. The arrows along the top of the graph show various wavelengths, or the centers of wavelength ranges that may be used in optical networks. However, it has been found that the deuteration of an organic liquid, i.e. the replacement of hydrogen on the liquid molecule with deuterium, results in a shift of the absorption spectrum to longer wavelengths. FIG. 4B shows the absorption spectrum of deuterated propylene glycol. As can be seen, the major absorption edge has been shifted by deuteration from around 1400 nm to a wavelength higher than 1800 nm. Thus, deuterated propylene glycol may be suitable for broad wavelength application in an EWOD device used in fiber communications, whereas undeuterated propylene glycol is less suitable. Moreover, it has been found that deuteration of various liquids does not result in a significant change in the refractive index of the liquid, nor does it result in a significant change in the temperature dependence of the refractive index, thus allowing deuterated liquids to be useful in the broad wavelength operation of EWOD switches.

Figure 5A:
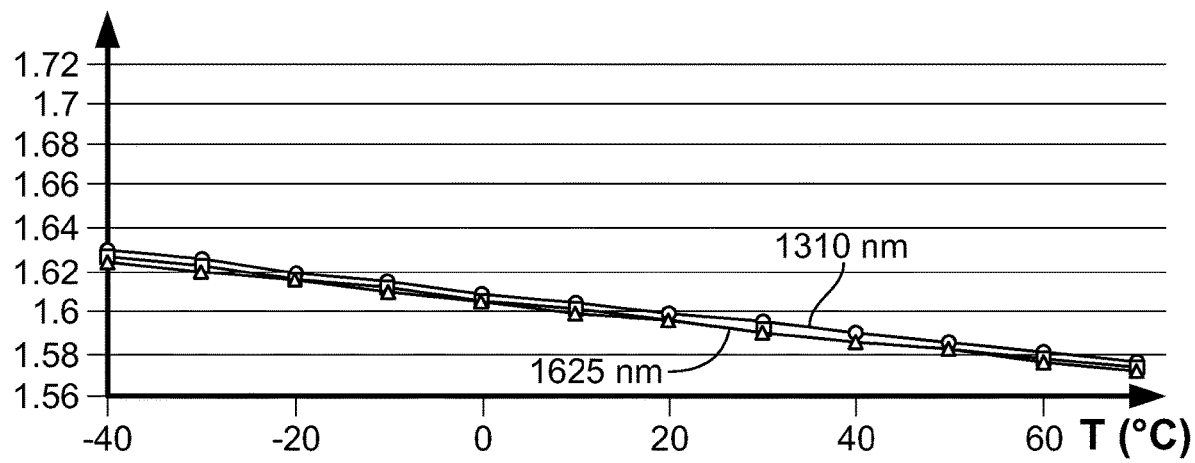
FIGS. 5A and 5B present refractive index at three different wavelengths, as a function of temperature for non-deuterated diphenylsulfide and non-deuterated hydroxypropylene carbonate, respectively.
Figure 5B:
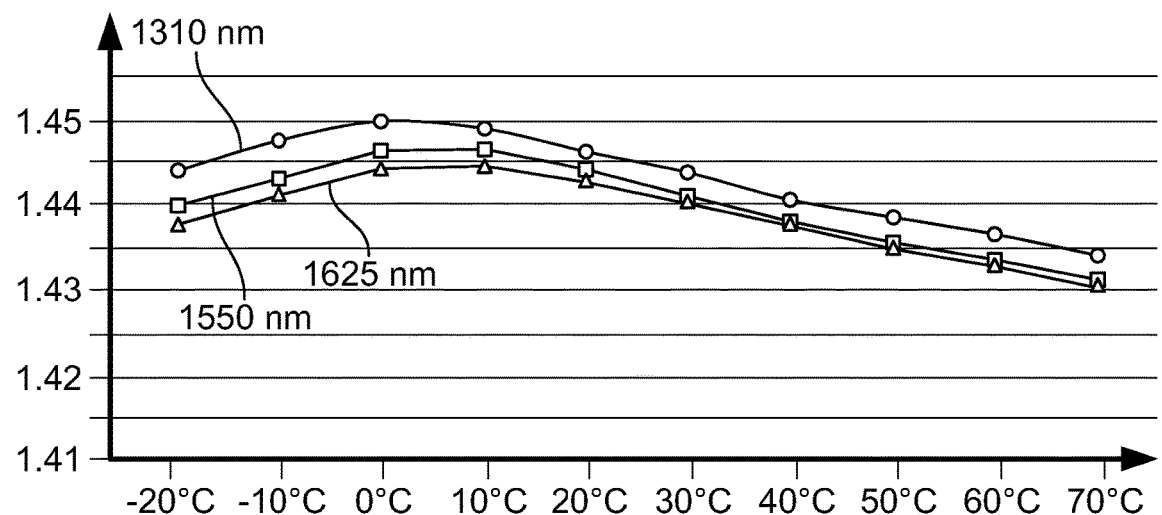

FIGS. 5A and 5B show graphs of the temperature dependence of the refractive indices of undeuterated DPS and HPC over the temperature ranges of at least −20° C. to 70° C. The refractive index of DPS falls approximately linearly with temperature from about 1.63 to about 1.58 over the range, while the refractive index of HPC varies from a maximum of about 1.45 (for a wavelength of 1310 nm) to a minimum of about 1.437. There is very little difference in DPS for the refractive indices between wavelengths of 1310 nm and 1625 nm, while in HPC the difference in refractive index is at most about 0.007 between 1310 nm and 1625 nm, over the temperature range. Thus the difference in refractive index stays at about 0.15 or more over the temperature range.

Figure 6A:
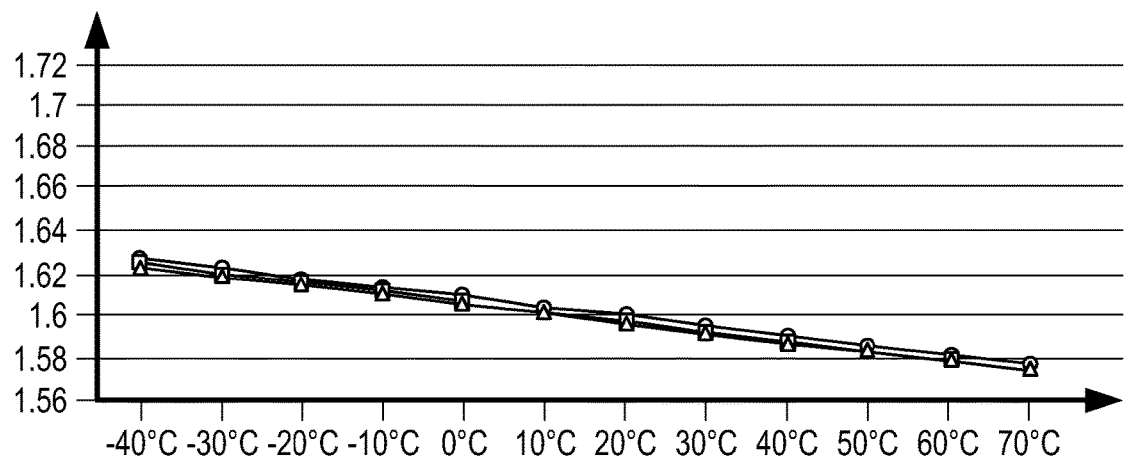
FIGS. 6A and 6B present refractive index at three different wavelengths, as a function of temperature for deuterated diphenylsulfide and deuterated hydroxypropylene carbonate, respectively.
Figure 6B:
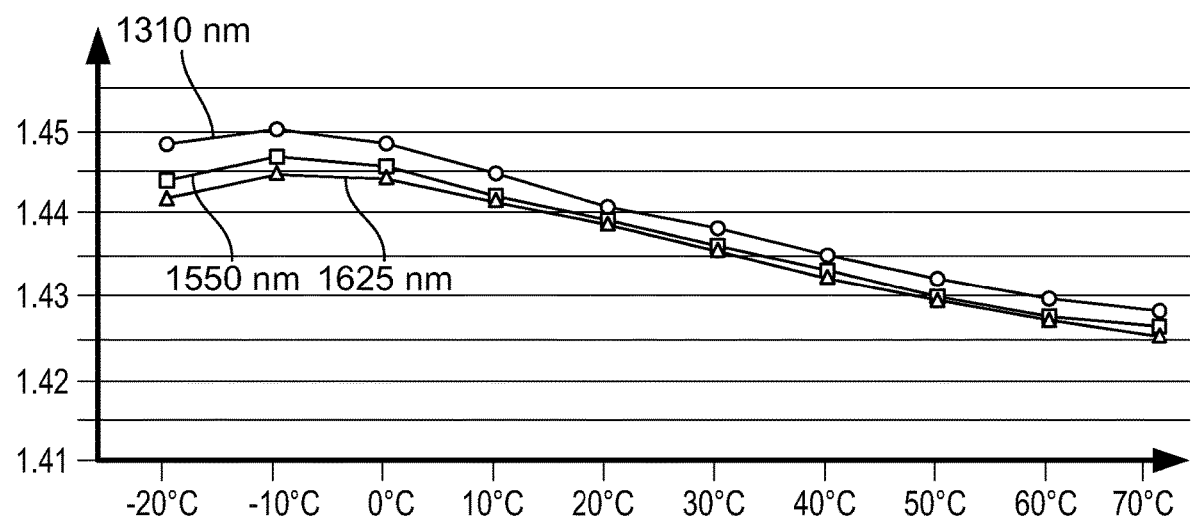

FIGS. 6A and 6B, show graphs of the temperature dependence of the refractive indices of deutered DPS and HPS over the same temperature range. As can be seen, there is very little difference in the absolute values of refractive index, for a given wavelength and temperature, between the deuterated and undeuterated liquids, although the peak in the HPC refractive index has moved a little to lower temperatures. Thus, deuteration can increase the wavelength range over which these liquids can be used in EWODs, without affecting their refractive index capabilities.

Figure 7A:
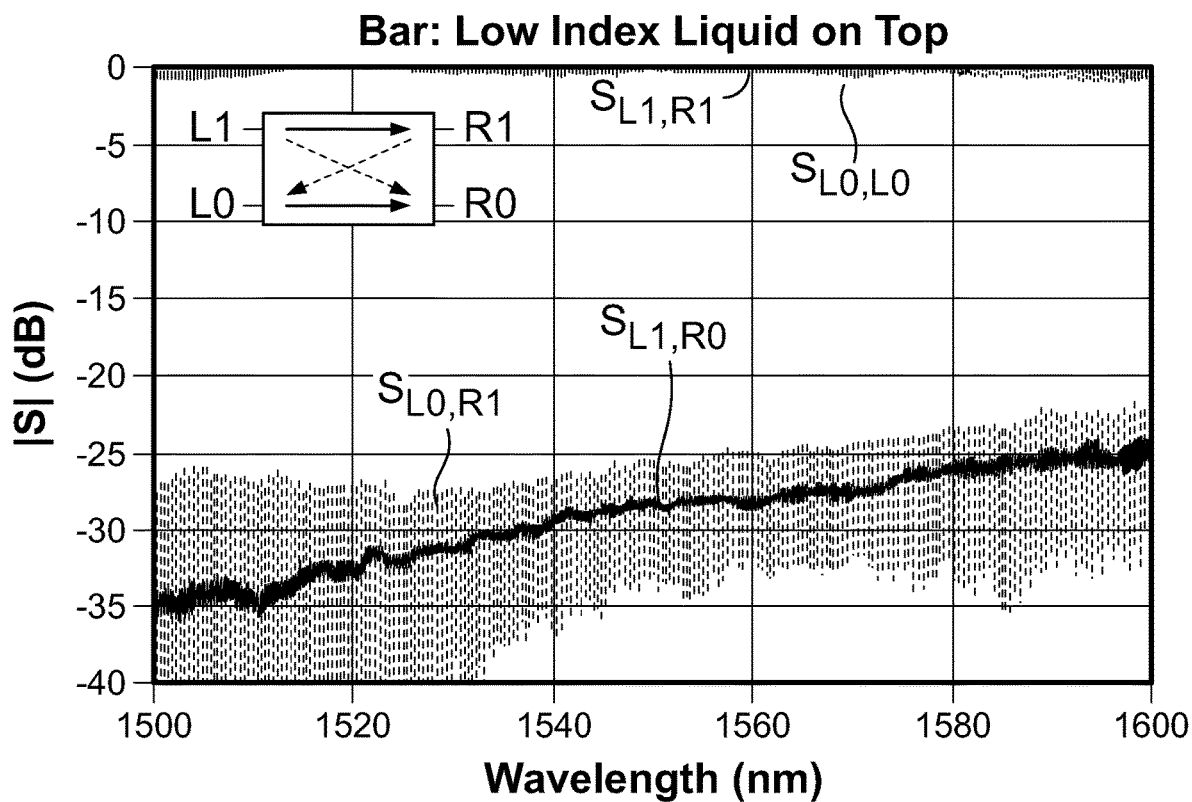
FIG. 7A presents optical transmission data for a waveguide optical switch in the bar state, using deuterated liquids, according to an embodiment of the invention.
Figure 7B:
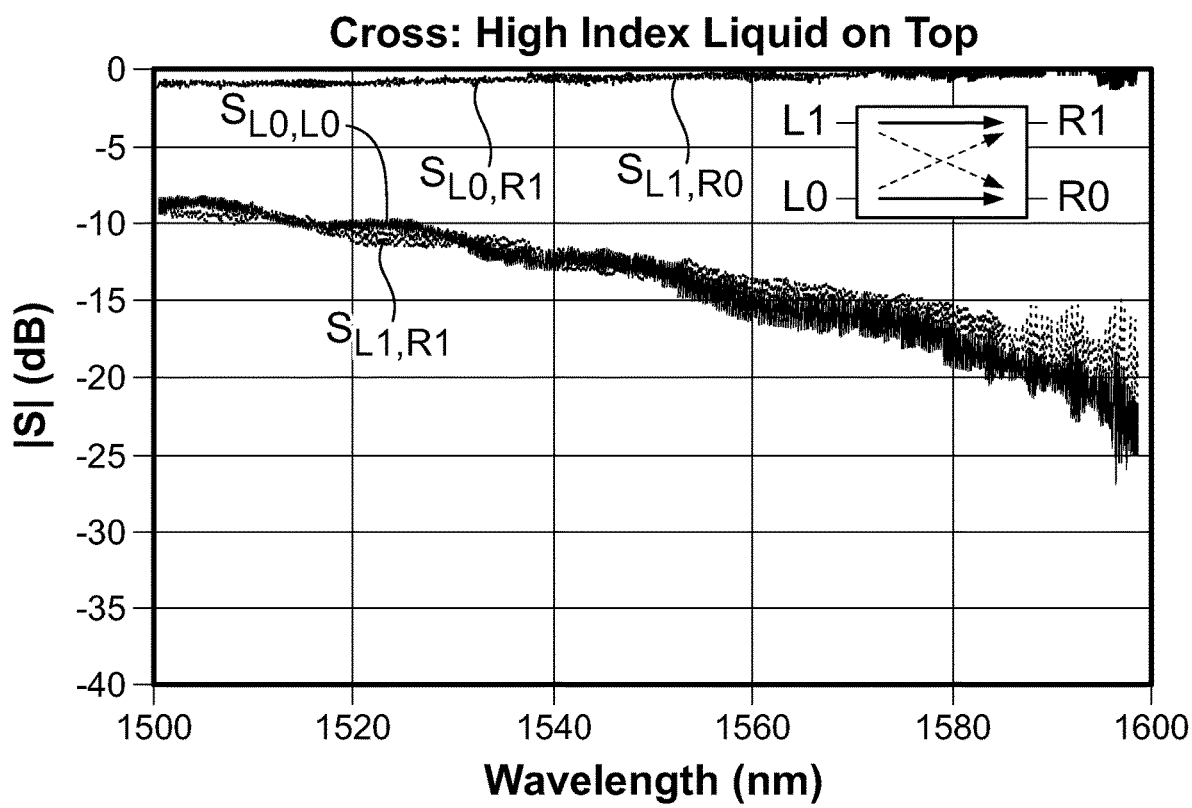
FIG. 7B presents optical transmission data for a waveguide optical switch in the cross state, using deuterated liquids, according to an embodiment of the invention.

Experimental results obtained from an EWOD switch using deuterated HPC as the low index liquid and deuterated DPS as the high index liquid are shown in FIGS. 7A and 7B for wavelengths over the range 1500 nm to 1600 nm. FIG. 7A shows various signals from an EWOD switch having inputs, L0, L1 to two waveguides and outputs, R0, R1, from the two waveguides (see inset). The two waveguides form a waveguide optical switch of the type discussed above. The operation of the switch is shown for four different optical conditions. Signals $S_{L0R0}$ and $S_{L1R1}$ respectively denote the signals obtained at the output from the first and second waveguides when light is input to the first and second waveguide. Signal $S_{L0R1}$ denotes the signal obtained as light output from the second waveguide when light enters along the first waveguide, and indicates the coupling of light from the first waveguide to the second waveguide. Signal $S_{L1R0}$ denotes the signal obtained as light output from the first waveguide when light enters along the second waveguide, and indicates the coupling of light from the second waveguide to the first waveguide.

When the switch is in the bar state, light propagates along with waveguides without significant coupling to the other waveguide. Thus, the bar signals $S_{L0R0}$ and $S_{L1R1}$ should both be relatively high and the cross signals $S_{L1R0}$ and $S_{L0R1}$ should be relatively low. When the switch is in the cross state, the cross signals $S_{L1R0}$ and $S_{L0R1}$ should both be relatively high and the bar signals should both be relatively low.

FIG. 7A shows the signal strength as a function of wavelength when the EWOD switch is in the bar state, i.e. when the low index deuterated HPS is above the second waveguide. The two bar signals $S_{L0R0}$ and $S_{L1R1}$ are relatively high across the wavelength range, around 0 dB, while the two cross signals, $S_{L1R1}$ and $S_{L0R1}$, are relatively low, between about −25 dB and 35 dB.

FIG. 7B shows the signal strength as a function of wavelength when the EWOD switch is in the cross-state, i.e. when the high index deuterated DPS is above the second waveguide. The two cross signals, $S_{L1R0}$ and $S_{L0R1}$, are relatively high, around 0 dB, while the two bar signals, $S_{L0R0}$ and $S_{L1R1}$, are relatively low, from about −10 dB to about −20 dB. Thus, active switching of the optical signals across a 100 nm wavelength range is obtained using deuterated liquids, without significant optical losses for the desired bar or cross signals.

While various examples were provided above, the present invention is not limited to the specifics of the examples. For example, either or both the low and high refractive optical liquids may be deuterated.

As noted above, the present invention is applicable to fiber optical communication and data transmission systems. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

The invention claimed is:

1. An electro-wetting optical device comprising:
a substrate supporting at least a first waveguide, a second waveguide, and a coupling region between the first and second waveguides;
a first portion of a first optical liquid, the first optical liquid having a first refractive index, and a second portion of a second optical liquid, the second optical liquid having a second refractive index, at least one of the first optical liquid and the second optical liquid being deuterated;
wherein the first portion of the first optical liquid and the second portion of the second optical liquid are moveable relative to the coupling region whereby, under a first switching configuration the first optical liquid is positioned at the coupling region so as to provide a first effective refractive index for light propagating along the first waveguide and under a second switching configuration the second optical liquid is positioned at the coupling region so as to provide a second effective refractive index for light propagating along the first waveguide.

2. A device according to claim 1, wherein both the first optical liquid and the second optical liquid are deuterated.

3. A device according to claim 1, wherein the first liquid comprises deuterated diphenylsulphide.

4. A device according to claim 1, wherein the second liquid comprises one of deuterated hydroxypropylene carbonate, deuterated ethylene glycol, and deuterated propylene glycol.

5. A device according to claim 1, wherein light propagating along the first waveguide is coupled to the second waveguide when the device is in one of the first and second switching configurations and not coupled to the second waveguide when the device is in the other of the first and second switching configurations.

6. A device as recited in claim 5, wherein the first and second waveguides comprise a coupler.

7. A device as recited in claim 1, wherein the coupling region comprises an etched region of the substrate so that an upper surface of the first waveguide is able to contact the first and second optical liquids.

* * * * *